Jan. 3, 1956 D. M. SCHWARTZ ET AL 2,729,532
CRAWLER TREAD TAKE-UP DEVICE
Original Filed Oct. 24, 1950 4 Sheets-Sheet 1

INVENTORS
DANIEL M. SCHWARTZ
& THEODORE N. HACKETT

BY *Stowell + Evans*

ATTORNEYS

Jan. 3, 1956     D. M. SCHWARTZ ET AL     2,729,532
CRAWLER TREAD TAKE-UP DEVICE
Original Filed Oct. 24, 1950     4 Sheets-Sheet 2

INVENTORS
DANIEL M. SCHWARTZ &
THEODORE N. HACKETT

BY *Stowell + Evans*

ATTORNEYS

Jan. 3, 1956  D. M. SCHWARTZ ET AL  2,729,532
CRAWLER TREAD TAKE-UP DEVICE
Original Filed Oct. 24, 1950  4 Sheets-Sheet 3

INVENTORS
DANIEL M. SCHWARTZ &
THEODORE N. HACKETT

BY Stowell + Evans

ATTORNEYS

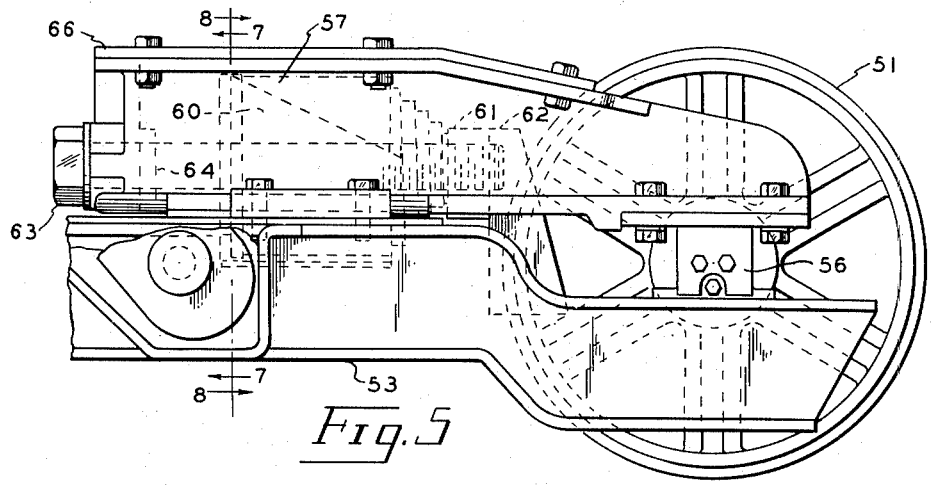
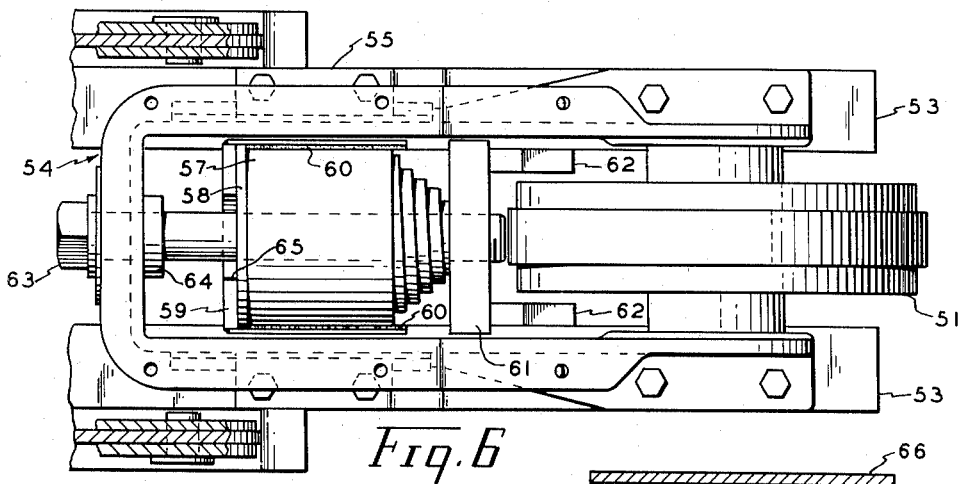
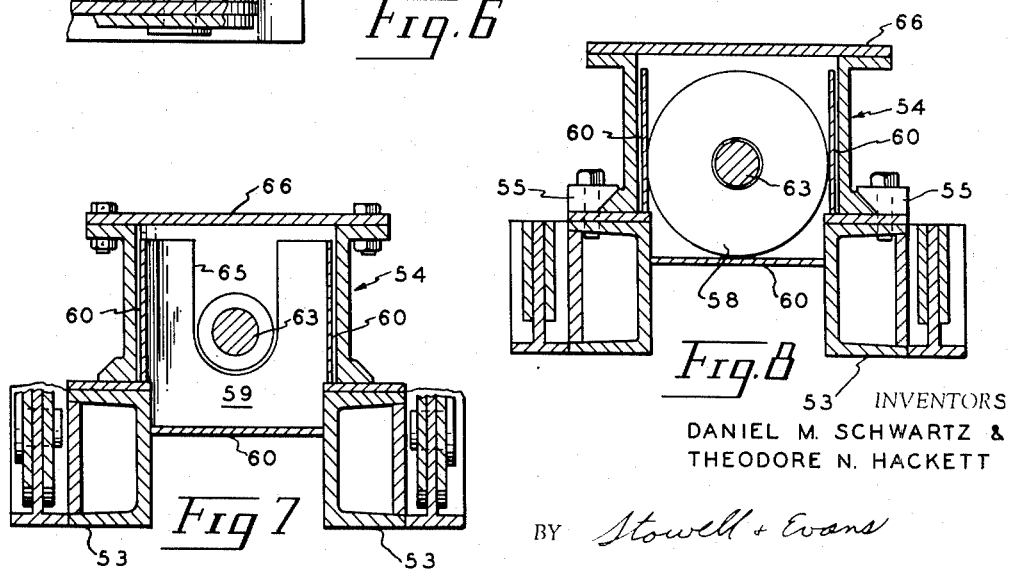

United States Patent Office 2,729,532
Patented Jan. 3, 1956

2,729,532

CRAWLER TREAD TAKE-UP DEVICE

Daniel M. Schwartz and Theodore N. Hackett, Salt Lake City, Utah, assignors to The Eimco Corporation, Salt Lake City, Utah, a corporation of Utah Original application October 24, 1950, Serial No. 191,808, now Patent No. 2,689,660, dated September 21, 1954. Divided and this application December 14, 1951, Serial No. 261,834

4 Claims. (Cl. 305—9)

This invention relates to material handling machines and the like and more particularly to such machines mounted on individually operated crawlers or self-laying tracks.

It is an object of the invention to provide such a machine having a crawler take-up device whereby under excessive load the crawler drive will run free of the self-laying tracks protecting the treads and sprocket shafts of the machine from overloads and breakage.

Another object is to provide such a crawler take-up device that can be installed and removed as a completely assembled unit to facilitate assemblage and to simplify and speed repairs.

This application is a division of application Serial No. 191,808, filed October 24, 1950, now Patent No. 2,689,660.

These and other objects and advantages of the invention will appear more clearly in connection with the illustrative embodiments of the invention shown by way of illustration on a material handling machine of the overhead bucket type, in the accompanying drawings, in which:

Fig. 5 is an enlarged detail side view of the crawler take-up device;

Fig. 6 is a plan view of the structure shown in Fig. 5 with the cover plate removed to show structural details;

Fig. 7 is a section on line 7—7 of Fig. 5; and

Fig. 8 is a section on line 8—8 of Fig. 5.

Figure 1:
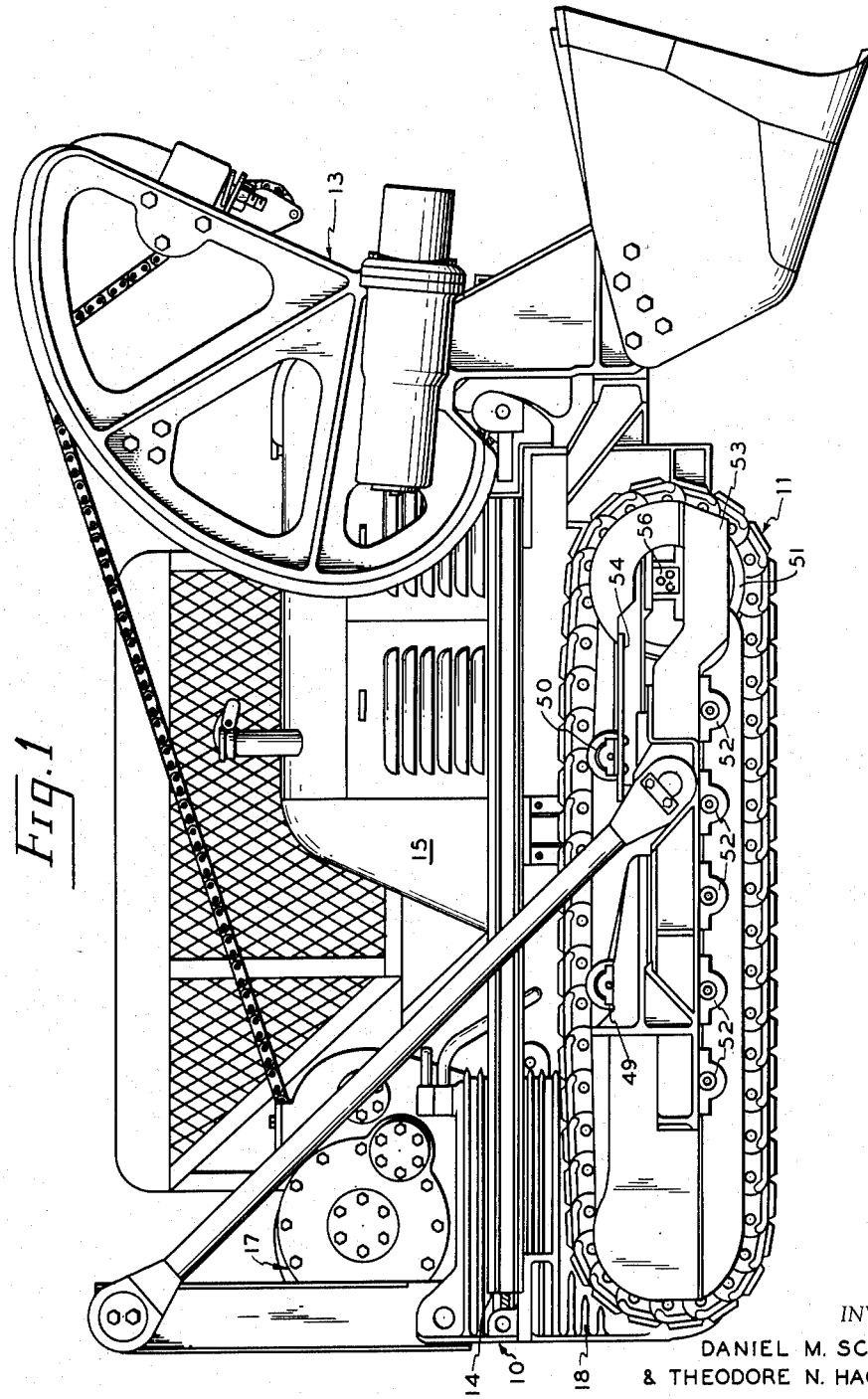
Fig. 1 is a right side elevation of a overhead material handling machine embodying the principles of the invention.

With reference to the illustrative embodiments of the invention and in particular to Fig. 1 there is shown a mining apparatus embodying the principles of the invention which generally comprises a main frame or body 10 mounted on individually operated and controlled crawler or self-laying track units 11.

The main frame 10 carries an overhead bucket assembly 13 upon parallel tracks 14 secured to the frame 10.

At the forward end of the frame is the power plant generally designated 15 wherein is housed a prime mover to supply power for the shovel bucket and the self-laying tracks.

Figure 2:
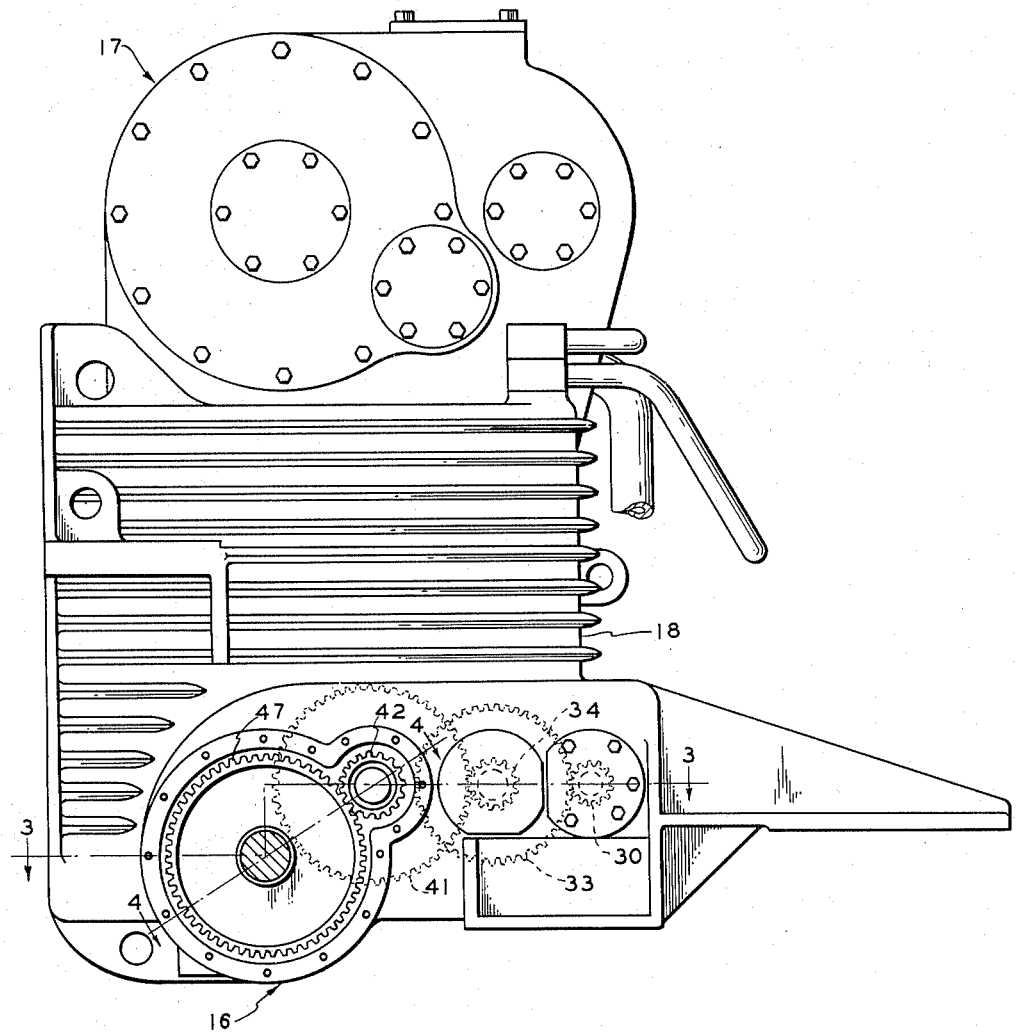
Fig. 2 is an enlarged detail view of the fluid reservoir casting showing structural details of the crawler drives.
Figure 3:
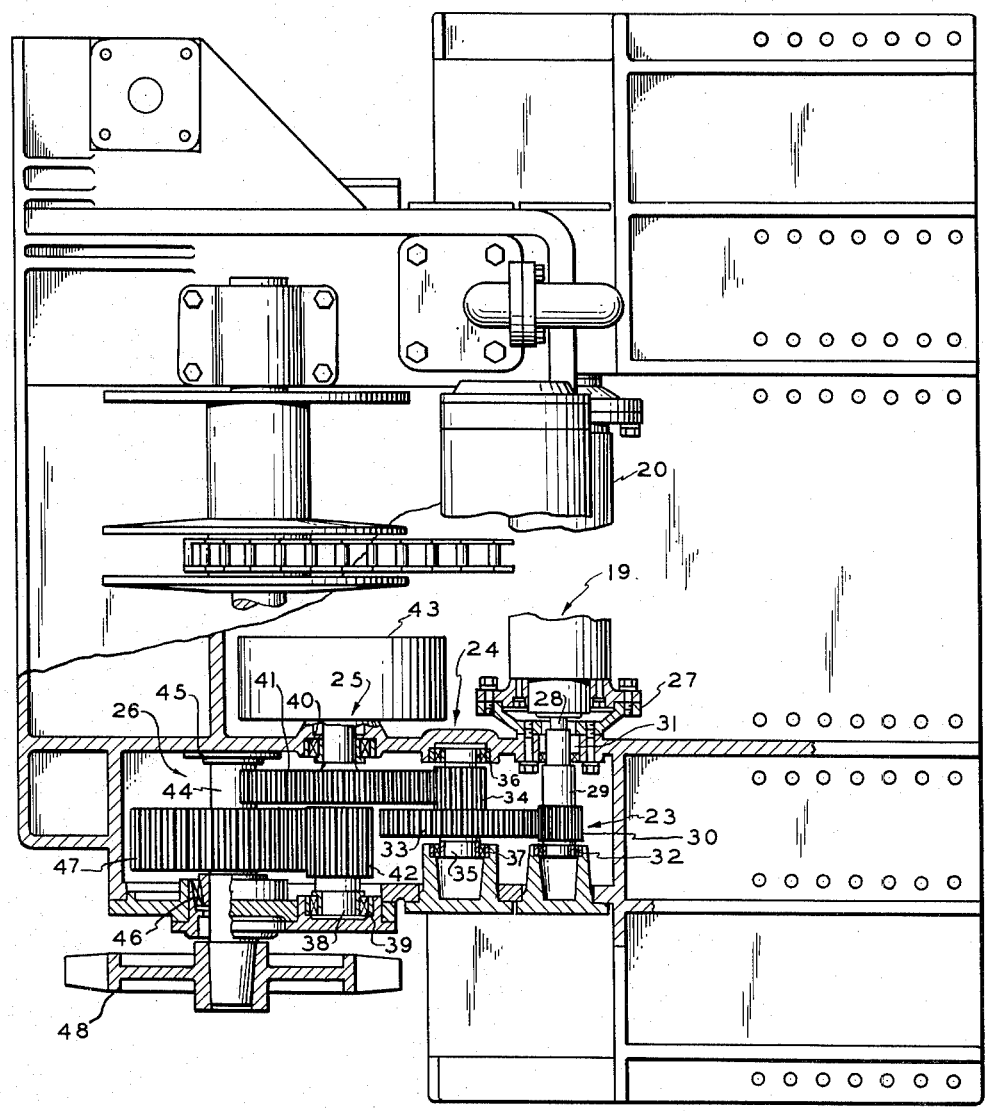
Fig. 3 is a plan view of the structure shown in Fig. 2 with a portion broken away substantially on line 3—3 of Fig. 2 showing structural details of the crawler gear train.
Figure 4:
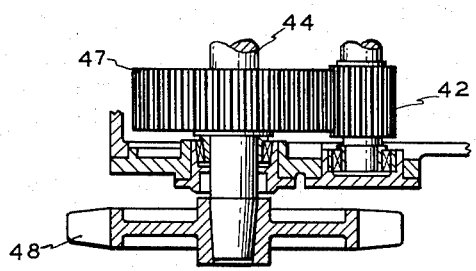
Fig. 4 is a fragmentary view substantially on line 4—4 of a portion of Fig. 2 showing structural details of the crawler drive.

Referring particularly to Figs. 2, 3 and 4, at the rearward end of the mining machine between the crawler treads are located the crawler drives 16, the bucket drive 17 and the hydraulic reservoir 18.

The crawler drives 16 are located on each side of the hydraulic reservoir 18, each crawler having an independent fluid pressure motor 19 and 20 and an independent gear train.

Each crawler gear train comprises a motor driven pinion assembly 23, a first intermediate gear assembly 24, a second intermediate gear assembly 25, and a sprocket shaft assembly 26.

Motor driven pinion assembly 23 comprises crawler drive motor mount 27, motor drive shaft 28, pinion shaft 29, gear 30, and inboard and outboard bearings 31 and 32.

The first intermediate gear assembly 24 comprises gears 33 and 34, shaft 35, and inboard and outboard bearings 36 and 37.

Shaft 38 of the second intermediate assembly 25 rotates in bearings 39 and 40 and is provided with gears 41 and 42, and a brake drum 43.

Sprocket shaft assembly 26 comprises shaft 44, housed in bearings 45 and 46, gear 47 and sprocket 48.

Thus the crawler motor drives the endless track through gear assemblies 30, 33, 34, 41, 42, 47 and sprocket 48. An identical gear train provided on the other side of the hydraulic reservoir 18 drives the other endless track.

The crawler treads have upper tread supporting idler wheels 49 and 50, tread tension idler 51, and tractor supporting idlers 52. Idlers 49 and 52 are mounted on the crawler frame members 53, while the tread-tension idler 51 and upper tread support idler 50 are carried in a U-shaped spring-loaded take-up member, generally designated 54, slidably carried on the crawler frames 53 as shown in detail in Figs. 5, 6, 7 and 8.

The tread tension idler support 54 is slidably carried by frame members 53 and held in engagement therewith by beveled bearing blocks 55 bolted to the frame members. The forward ends of U-frame 54 carry front idler wheel bearing housing 56, the under sides of which provide sliding surfaces in engagement with frame 53.

Spring 57 and washer 58 are supported between frames 53 by thrust plate 59, and thrust stops 60 welded to the frames.

In the preferred form of the invention, due to the high load requirements and the compactness of the crawler take-up device, spring 57 is of the volute tension type; however, other types of springs may be employed such as a spiral or elliptic leaf spring.

The forward end of volute spring 57 bears against nut 61 which is held against forward movement by stops 62 also welded to the crawler frames 53. A bolt 63 shouldered against the rearward end of U-frame 54, passes through thrust plate 59, washer 58, and spring 57, and engages the nut 61.

It will be seen that as bolt 63 is screwed into nut 61 the U-frame and idler assembly 54 are advanced as a unit, taking up any slack in the crawler treads which pass around the idler. When the crawler treads are taken up tightly continued rotation of bolt 63 compresses spring 57 imposing a tension upon the treads. Unscrewing the bolt allows the U-frame and idler to be pushed backwards to allow unfastening and removal of the crawler treads.

After the slack has been taken up in the treads, dirt or rocks packing in the crawler treads would overload the tracks when the obstruction tries to pass between the treads and the sprocket or idler wheels. This extra tension created in the treads by the obstruction forces the idler 51 and U-frame 54 rearwardly against the compression of volute spring 57 allowing the obstruction to pass. The rearward displacement of U-frame 54 is limited by nut 61 contacting thrust stops 60. The maximum rearward displacement obtainable is sufficient to allow the crawler treads to disengage the teeth of sprocket wheel 48. Thus, under a severe overload the sprocket will run free of the treads. The initial compression of spring 57 is regulated so that under normal running, tension created in the treads will not overcome this preload and compress the spring.

To facilitate assemblage and to simplify and speed repairs, the crawler take-up device can be installed and removed as a completely assembled unit. To accomplish this a hub 64 longer than the thickness of thrust plate 59 is provided on the U-frame. This hub is adapted to fit in U-shaped slot 65 of the thrust plate.

Before mounting the assembly, washer 58, spring 57, nut 61, and bolt 63 are assembled in U-frame 54. The washer is brought up next to the hub 64, and the spring compressed by tightening the bolt, until the distance between the washer and the nut is less than the distance between thrust plate 59 and stops 62. Cover plate 66 is then secured to the U-frame and the whole assembly is lowered onto frames 53, hub 64 passing into slot 65 of the thrust plate. Bolt 63 is then unscrewed to allow the compressed spring to expand to its normal position between the thrust plate 59 and stops 62. Beveled bearing blocks 55 are then attached to secure the take-up assembly to the crawler frame of the mining machine.

From the foregoing description of the invention, it will be seen that an improved machine having a crawler take-up device is provided whereby the aims, objects and advantages are fully accomplished.

Related subject matter is disclosed in the following applications: Serial No. 191,807, filed October 24, 1950; Serial No. 228,082, filed May 24, 1951, now Patent No. 2,684,162; Serial No. 230,365, filed June 7, 1951; and Serial No. 261,835, filed December 14, 1951.

We claim:

1. In a vehicle including a main frame, paired lateral crawler units on each side of said main frame, each crawler unit including a crawler frame, a motor driven sprocket and an idler pulley carried at opposite ends of the crawler frame, an endless crawler chain extending between said sprocket and said idler pulley, and means slidably mounting said idler pulley on said crawler frame whereby the crawler chain is maintained under tension between the sprocket and the idler pulley, said means comprising a U-shaped member slidably mounted on the crawler frame, bearing means secured at the bifurcated end of the U-shaped member rotatably carrying said idler pulley, a spring mounted entirely within the U-shaped member and between the bifurcations thereof rearwardly of said bearing means, said spring bearing at one end against the crawler frame, and means carried by said U-shaped member engaging the other end of said spring whereby the idler pulley carried by the slidably mounted U-shaped member is urged into engagement with the crawler chain.

2. In a vehicle including a main frame, paired lateral crawler units on each side of said main frame, each crawler unit including a crawler frame, a motor driven sprocket and an idler pulley carried at opposite ends of the crawler frame, an endless crawler chain extending between said sprocket and said idler pulley, and means slidably mounting said idler pulley on said crawler frame whereby the crawler chain is maintained under tension between the sprocket and the idler pulley, said means comprising a U-shaped member slidably mounted on the crawler frame, bearing means secured at the bifurcated end of the U-shaped member rotatably carrying said idler pulley, a spring mounted entirely within the U-shaped member and between the bifurcations thereof rearwardly of said bearing means, said spring bearing at one end against the crawler frame, a bolt shouldering at one end against the base of the U-shaped member and extending through said spring, and a nut carried at the other end of the bolt and engaging the other end of the spring.

3. In a vehicle including a main frame, paired lateral crawler units on each side of said main frame, each crawler unit including a crawler frame, a motor driven sprocket and an idler pulley carried at opposite ends of the crawler frame, an endless crawler chain extending between said sprocket and said idler pulley, and means slidably mounting said idler pulley on said crawler frame whereby the crawler chain is maintained under tension between the sprocket and the idler pulley, said means comprising a U-shaped member slidably mounted on the crawler frame, bearing means secured at the bifurcated end of the U-shaped member rotatably carrying said idler pulley, a plate secured to the crawler frame and extending transversely between the U-shaped member rearwardly of said bearing means and having a vertically extending slot therein, a spring mounted between the bifurcations of said U-shaped member between said plate and the bearing means and bearing at one end against said plate, a bolt shouldering at one end against the base of the U-shaped member and extending through the slot in said plate and said spring, and a nut carried at the other end of the bolt and engaging the other end of the spring.

4. The invention as defined in claim 3 including a hub on said bolt extending toward said plate wherein the hub has a length greater than the thickness of said plate, and a width less than the width of the slot therein, whereby compression of said spring between said nut and said hub reduces the length of the spring and permits removal of the means slidably mounting the idler pulley from the crawler frame.

References Cited in the file of this patent

UNITED STATES PATENTS

| | | |
|---|---|---|
| 1,315,297 | Fuchs | Sept. 9, 1919 |
| 1,964,779 | Ziegler | July 3, 1934 |
| 2,315,421 | Heaslet | Mar. 30, 1943 |
| 2,378,942 | Norelius | June 26, 1945 |
| 2,581,365 | Darragh | Jan. 8, 1952 |
| 2,618,516 | Smith | Nov. 18, 1952 |